US012108501B2

(12) United States Patent
Jones et al.

(10) Patent No.: US 12,108,501 B2
(45) Date of Patent: Oct. 1, 2024

(54) MEDIUM VOLTAGE BUS SYSTEM FOR ELECTRIC CIRCULATION HEATERS

(71) Applicant: WATLOW ELECTRIC MANUFACTURING COMPANY, St. Louis, MO (US)

(72) Inventors: Michael Jones, St. Louis, MO (US); Scott H. Boehmer, Hannibal, MO (US); Ted Von Arx, St. Louis, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 232 days.

(21) Appl. No.: 17/719,841

(22) Filed: Apr. 13, 2022

(65) Prior Publication Data

US 2023/0337332 A1 Oct. 19, 2023

(51) Int. Cl.
*H05B 3/26* (2006.01)
*H05B 3/08* (2006.01)

(52) U.S. Cl.
CPC ................ *H05B 3/26* (2013.01); *H05B 3/08* (2013.01)

(58) Field of Classification Search
CPC ... H05B 3/26; H05B 3/08; H05B 3/42; H05B 3/06; H05B 2203/035; H05B 2203/016; H05B 2203/011; H05B 2203/032; H05B 2203/005; F24H 9/1818; F24H 1/102
USPC .......................................................... 219/612
See application file for complete search history.

(56) References Cited

U.S. PATENT DOCUMENTS 3,004,090 A * 10/1961 Donovan ................ H05B 3/64 373/128
2017/0130887 A1 5/2017 Eder
2021/0136876 A1 5/2021 Dinauer et al.

FOREIGN PATENT DOCUMENTS

CN 109495990 A * 3/2019 ........... H05B 1/0202
CN 113251656 A 8/2021
KR 1020190085054 A 7/2019

OTHER PUBLICATIONS

International Search Report issued in corresponding International Application PCT/US2023/018526, mailed Jul. 31, 2023.

* cited by examiner

*Primary Examiner* — Nathaniel E Wiehe
*Assistant Examiner* — Alba T Rosario-Aponte
(74) *Attorney, Agent, or Firm* — Burris Law, PLLC

(57) ABSTRACT

A terminal assembly for a heater system includes a plurality of resistive heating elements arranged in multiple power phases includes a plurality of power busbars, a neutral busbar, a phase barrier disposed between each of the plurality of power busbars, and a plurality of interchangeable couplers. Each power busbar corresponds to a power phase of the multiple power phases and is configured to connect a power lead from one of the multiple power phases and a first end of a plurality of resistive heating elements. The resistive heating elements are in electrical communication with the power lead. The neutral busbar is offset longitudinally from the power busbars and configured to receive a second end of the resistive heating elements. The interchangeable couplers are configured to connect at least a subset of the resistive heating elements to at least one power busbar or at least one neutral busbar.

23 Claims, 8 Drawing Sheets

MEDIUM VOLTAGE BUS SYSTEM FOR ELECTRIC CIRCULATION HEATERS

FIELD

The present disclosure relates to heating systems, and more specifically to heat exchangers, or electric circulation heaters, having resistive heating elements, and configurations of electrical terminals for connecting to the resistive heating elements to a power supply.

BACKGROUND

The statements in this section merely provide background information related to the present disclosure and may not constitute prior art.

Industrial electric heaters generally heat materials such as solids, liquids, or gasses with resistance heating elements that convert electrical power to heat. In some applications, the resistance heating elements are submerged in the liquid or gas, or the liquid or gas flows between the resistance heating elements. In some applications, a large amount of power is used to bring the materials to the desired temperatures. For example, some applications require power greater than 1 megawatt, with some applications being in the range of 5 megawatts or greater. Typical low voltage electric heaters operate at around 700 volts but can require high electrical current (e.g., over 7,000 amps) to achieve the power required. The high current can require large and expensive power components, cables, and grounding strategies. Additionally, some industrial power sources require a step-down transformer to supply the low voltage.

The present disclosure addresses issues related to connecting and disconnecting resistive heating elements to a power supply in these industrial applications, including medium voltage heating systems, among other challenges with fluid heating vessels.

SUMMARY

This section provides a general summary of the disclosure and is not a comprehensive disclosure of its full scope or all of its features.

As used herein, the term “medium voltage” should be construed to mean between about 2,000V and 20,000V. It should be understood, however, that the teachings of the present disclosure are not limited to medium voltage heaters or heater systems.

In one form, the present disclosure provides a terminal assembly for a heater system having a plurality of resistive heating elements arranged in multiple power phases. The terminal assembly includes a plurality of power busbars, a neutral busbar, a phase barrier, and a plurality of interchangeable couplers. Each power busbar correspond to a power phase of the multiple power phases. Each power busbar being configured to connect a power lead from one of the multiple power phases and a first end of a plurality of resistive heating elements such that the plurality of resistive heating elements are in electrical communication with the power lead. The neutral busbar is offset longitudinally from the plurality of power busbars and configured to receive a second end of the plurality of resistive heating elements. The phase barrier is disposed between each of the plurality of power busbars. The plurality of interchangeable couplers is configured to connect at least a subset of the plurality of resistive heating elements to at least one power busbar or at least one neutral busbar.

In variations of this terminal assembly, which may be implemented individually or in any combination: the terminal assembly includes a plurality of shunt busbars, each shunt busbar corresponding to a power phase of the multiple power phases, and each shunt busbar being configured to connect one or more of the plurality of resistive heating elements in series; the plurality of the shunt busbars are longitudinally offset between the plurality of power busbars and the neutral busbar; the multiple power phases comprise three power phases; the terminal assembly further includes a baseplate offset longitudinally from the neutral busbar; the terminal assembly further includes a plurality of mounting posts disposed between the baseplate and at least one of the neutral busbar and the plurality of power busbars; each power busbar connects a power lead from one of the multiple power phases on one side and a first end of a plurality of resistive heating elements on an opposite side; each of the plurality of power busbars and the neutral busbars includes a plurality of apertures and the plurality of interchangeable couplers are installed within the apertures; at least one interchangeable coupler comprises at least one contact arm and at least one of the apertures defines at least one slot, and the at least one contact arm of the at least one interchangeable coupler is configured to be inserted through the at least one slot and rotated to abut an opposed side of the at least one power busbar or the at least one neutral busbar; the at least one interchangeable coupler comprises opposed contact arms and the at least one aperture defines opposed slots, and the opposed contact arms are configured to be inserted through the opposed slots and rotated to abut the opposed side of the at least one power busbar or the at least one neutral busbar; at least one interchangeable coupler comprises a threaded internal bore and the terminal assembly further includes a fastener disposed within the threaded internal bore to secure the at least one interchangeable coupler to the at least one power busbar or the at least one neutral busbar; the plurality of interchangeable couplers are either electrically conductive to provide an active electrical connection of a respective resistive heating element or electrically nonconductive to provide a passive electrical connection of a respective resistive heating element; and the phase barrier includes a central spindle and a plurality of blades extending radially away from the central spindle.

In another form of the present disclosure, a heating system includes the terminal assembly as set forth above and the plurality of resistive heating elements coupled to the terminal assembly. In variations of this heating system, which may be implemented individually or in any combination, the first and second ends of the plurality of resistive heating elements are located within the terminal assembly and at least one of the first and second ends is uncoupled to the plurality of power busbars and/or the neutral busbar via an interchangeable coupler that is electrically nonconductive; at least one resistive heating element comprises a terminal extension disposed within one of the interchangeable couplers; and the heating system further comprises an insulating material surrounding the terminal extension.

In yet another form of the present disclosure, a terminal assembly for a heater system having a plurality of resistive heating elements arranged in multiple power phases includes a plurality of power busbars, a neutral busbar, a plurality of shunt busbars, a phase barrier, and a plurality of interchangeable. Each power busbar corresponding to a power phase of the multiple power phases, and each power busbar being configured to connect a power lead from one of the multiple power phases and a first end of a plurality of resistive heating elements such that the plurality of resistive heating elements are in electrical communication with the power lead. The neutral busbar is offset longitudinally from the plurality of power busbars and configured to receive a second end of the plurality of resistive heating elements. Each shunt busbar corresponds to a power phase of the multiple power phases and a power busbar of the plurality of power busbars, and each shunt busbar being configured to connect at least two of the plurality of resistive heating elements in a series connection with one another between a corresponding power busbar and the neutral busbar. The phase barrier is disposed between each power phase of the plurality of power busbars and of the plurality of shunt busbars. The plurality of interchangeable couplers is configured to connect at least a subset of the plurality of resistive heating elements to at least one power busbar or at least one neutral busbar.

In variations of this terminal assembly, which may be implemented individually or in any combination: the plurality of the shunt busbars is longitudinally offset between the plurality of power busbars and the neutral busbar; each of the plurality of power busbars, each of the plurality of shunt busbars, and the neutral busbar are spaced apart from each other; the multiple power phases comprise of three power phases; the terminal assembly further comprises a baseplate offset longitudinally from the neutral busbar; and the terminal assembly further comprises a plurality of mounting posts disposed between the baseplate and the neutral busbar and between the baseplate and the plurality of shunt busbars.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
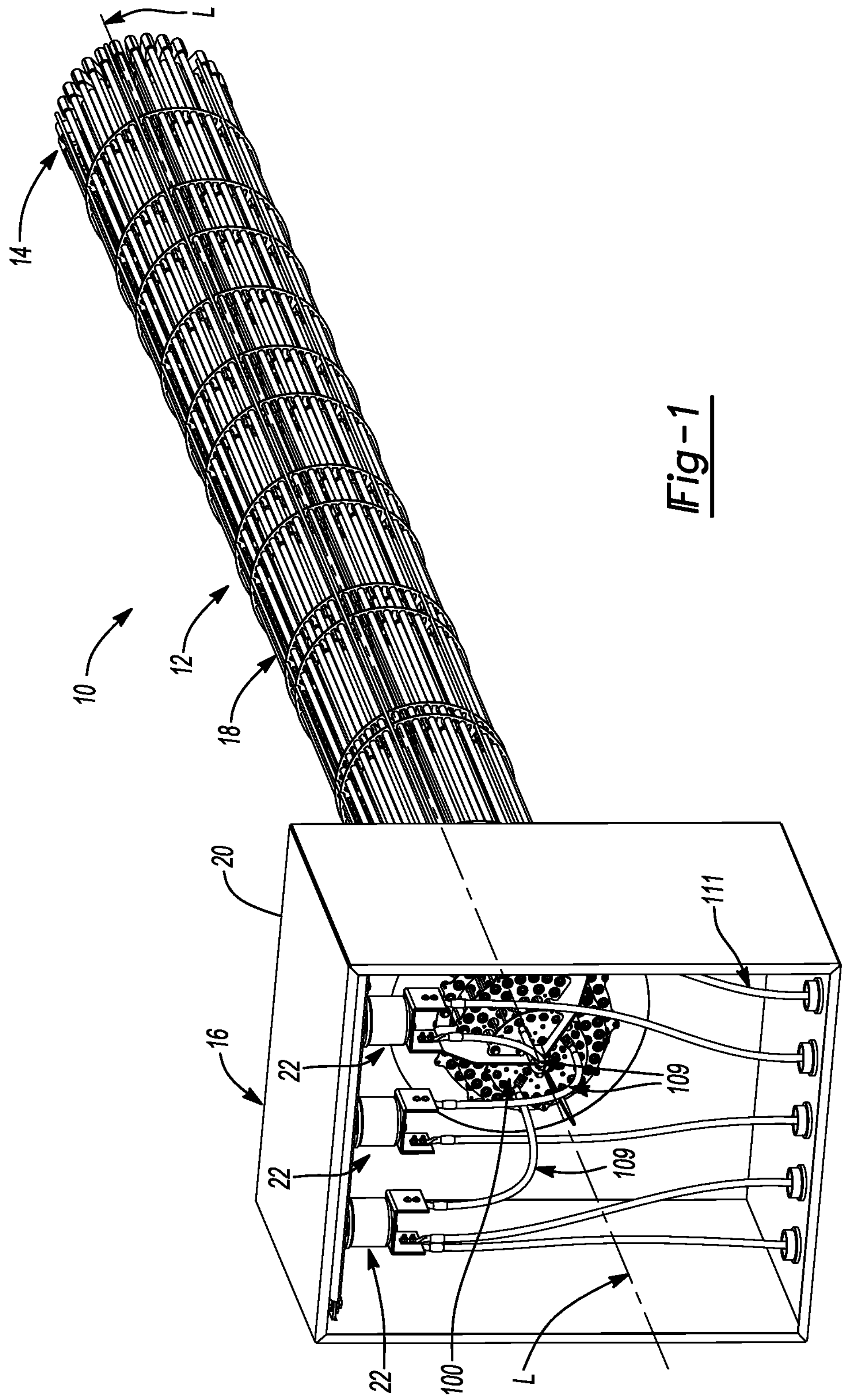
FIG. 1 is a perspective view of a power supply portion and resistive heating elements of a heater system for use in a circulation heater, or a heat exchanger, in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
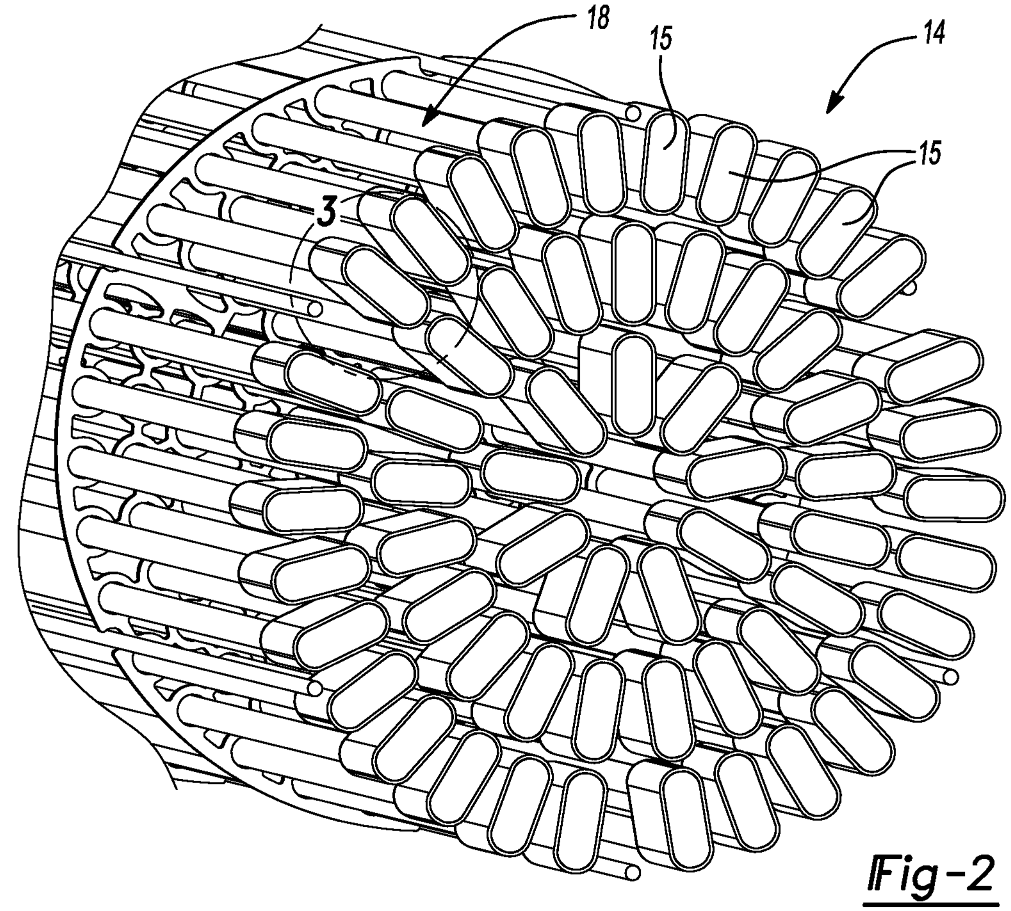
FIG. 2 is an enlarged partial perspective view of an end portion of the heater system of FIG. 1 in accordance with the teachings of the present disclosure.

Referring to FIGS. 1-2, a heating system for use in electric circulation heaters, by way of example, is illustrated and generally indicated by reference numeral 10. The heating system 10 includes a heating portion 12, a distal end portion 14, and a power supply portion 16. The heating portion 12 includes a plurality of resistive heating elements 18 that extend parallel to a longitudinal axis “L” of the heating system 10 between the power supply portion 16 and the distal end portion 14.

Figure 3:
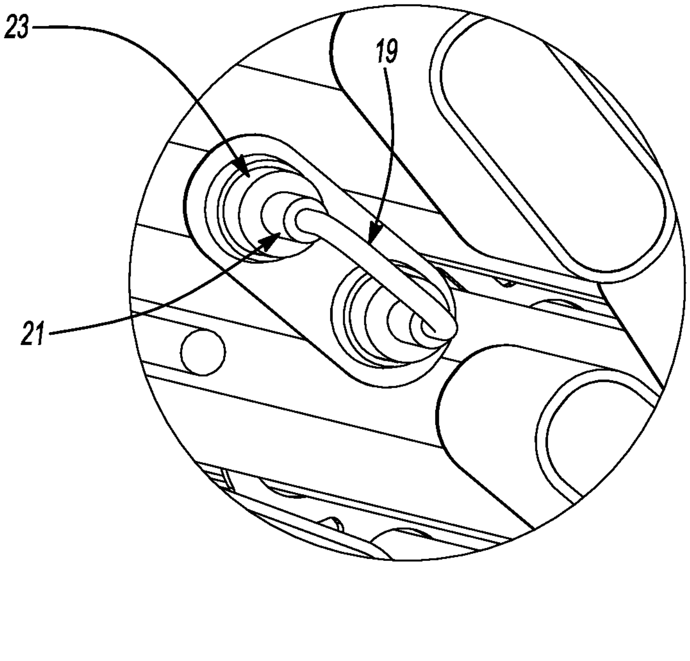
FIG. 3 is an enlarged partial perspective view of a resistive heating element with an end cap removed, exposing a u-bend return in the end portion of FIG. 2 in accordance with the teachings of the present disclosure.

With reference also to FIGS. 2-3, at the distal end portion 14, each resistive heating element 18 extends from the power supply portion 16, bends and curves at the distal end portion 14 (as shown in FIG. 3 with an end cap 15 removed) and extends back into the power supply portion 16. In one form, each resistive heating element 18 comprises at least one resistance wire 19 with an electrical termination portion (e.g., power pins, described in greater detail below relative to power supply portion 16), insulation material 21, and an outer sheath 23. Generally, the insulation material 21 surrounds the resistance wire 19 and a portion of the electrical termination portion. The outer sheath 23 houses the resistance wire 19, the insulation material 21 and a portion of the electrical termination portion. This construction is generally referred to as a “tubular” heater, however, the teachings herein should not be construed as being limited to this specific heater construction. For example, the teachings herein may be applied to systems with cartridge heaters or cable heaters, among others, while remaining within the scope of the present disclosure.

Referring back to FIG. 1, the power supply portion 16 includes an enclosure 20, connections for a multi-phase power supply 22, and a terminal assembly 100. The enclosure 20 is generally a housing designed to separate the three-phase power supply 22 and the terminal assembly 100 from the resistive heating elements 18, as well as to protect the terminal assembly 100 from an outside environment.

Figure 4A:
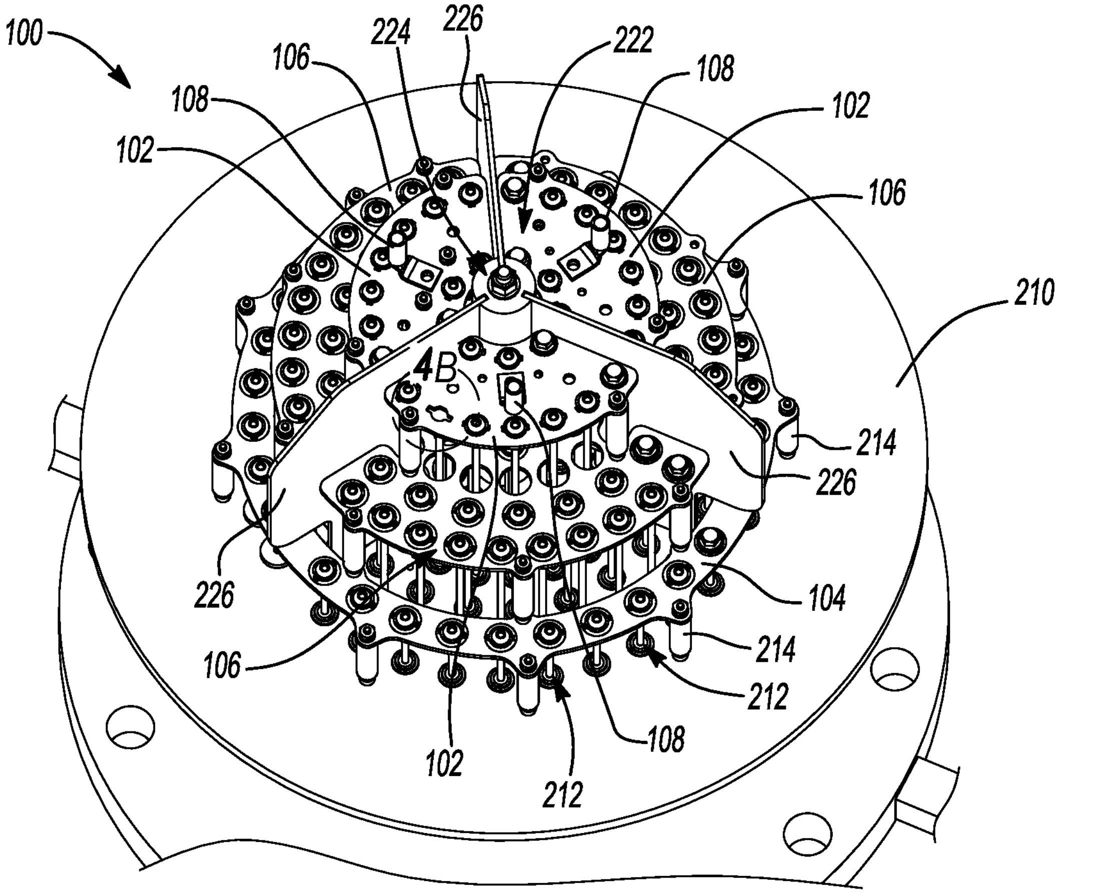
FIG. 4A is a perspective view of a terminal assembly of the heater system of FIG. 1 constructed in accordance with the teachings of the present disclosure.
Figure 4B:
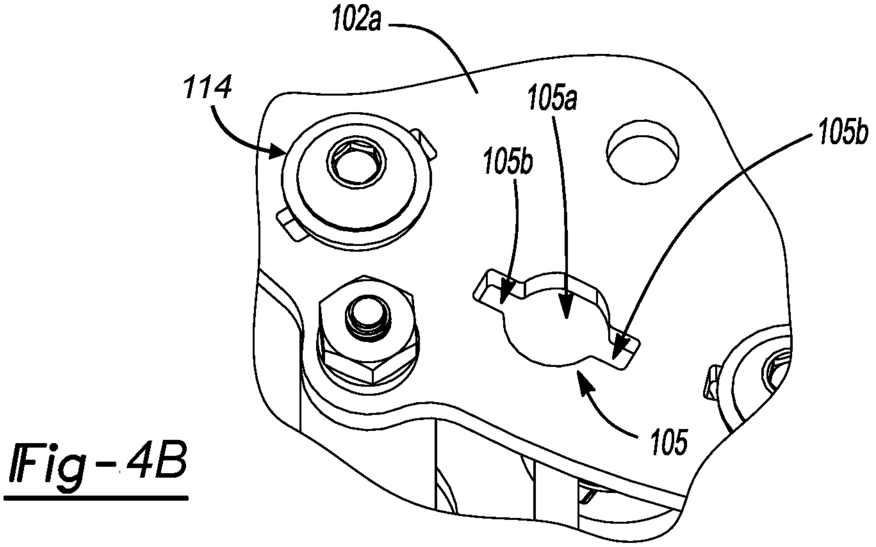
FIG. 4B is an enlarged perspective view of an example aperture of a power busbar of the terminal assembly of FIG. 4A constructed in accordance with the teachings of the present disclosure.
Figure 5B:
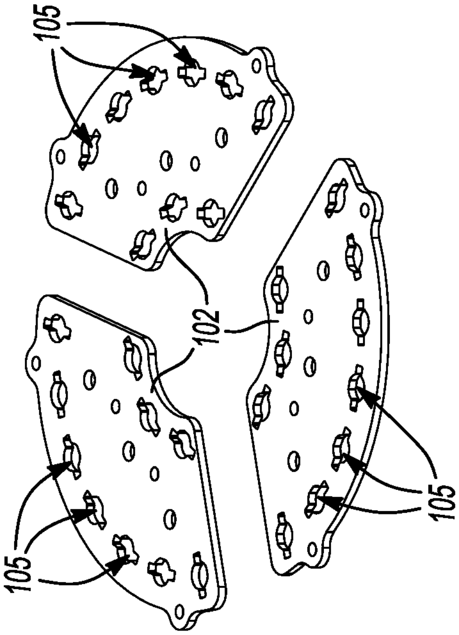
FIG. 5B is a perspective view of the power busbars of FIG. 5A.
Figure 5A:
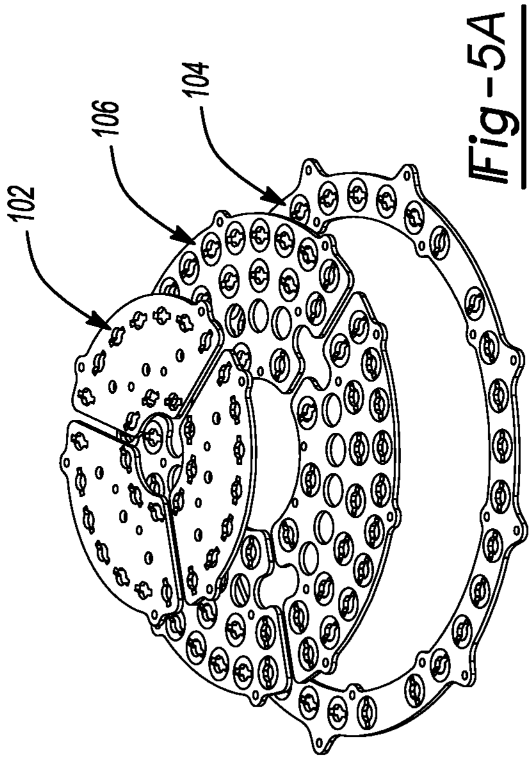
FIG. 5A is an exploded perspective view of power busbars, optional shunt busbars, and a neutral busbar of the terminal assembly of FIG. 4A.
Figure 5C:
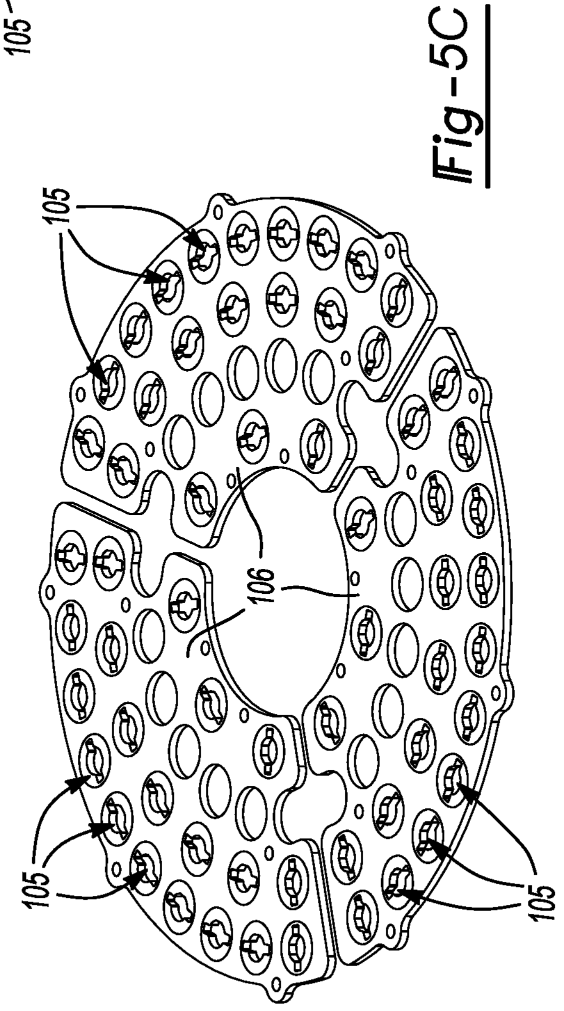
FIG. 5C is an exploded perspective view of the shunt busbars of FIG. 5A.
Figure 6A:
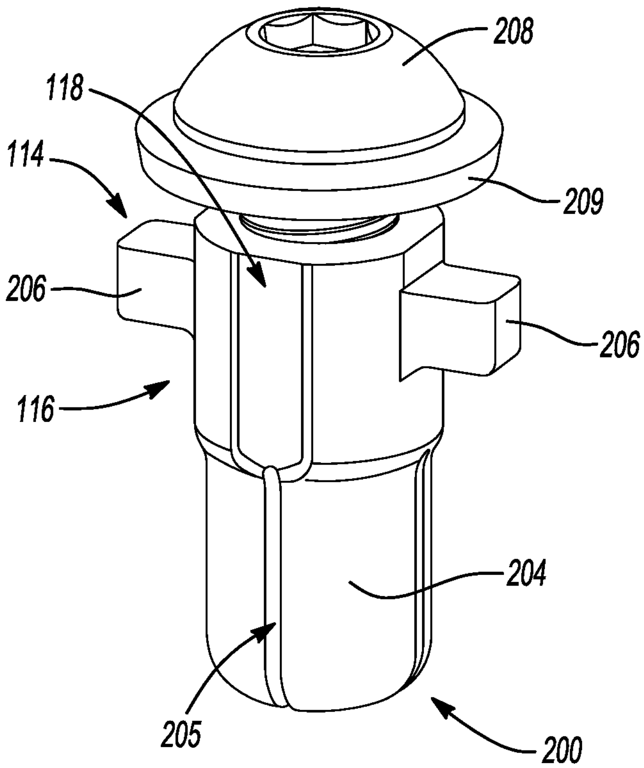
FIG. 6A is a perspective view of an interchangeable coupler constructed in accordance with the teachings of the present disclosure.
Figure 6B:
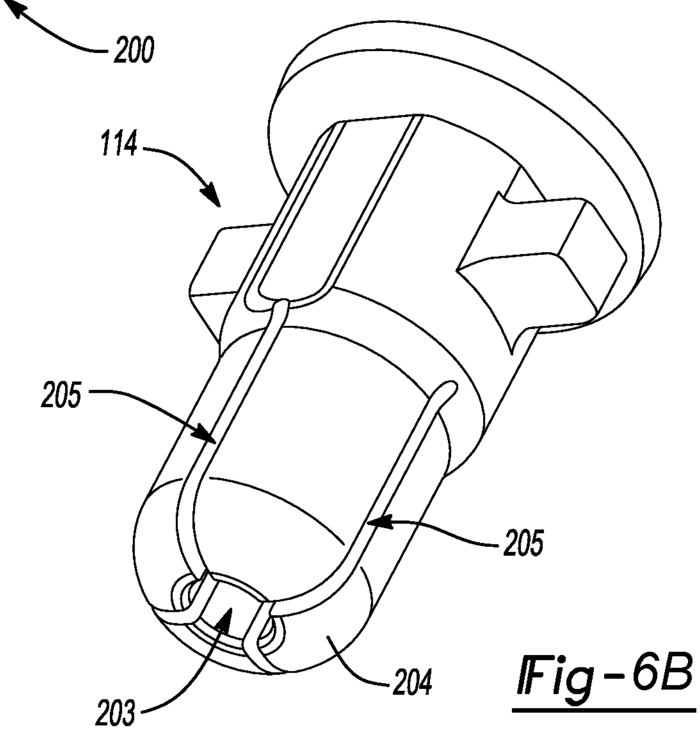
FIG. 6B is a bottom perspective view of the interchangeable coupler of FIG. 6A.
Figure 7:
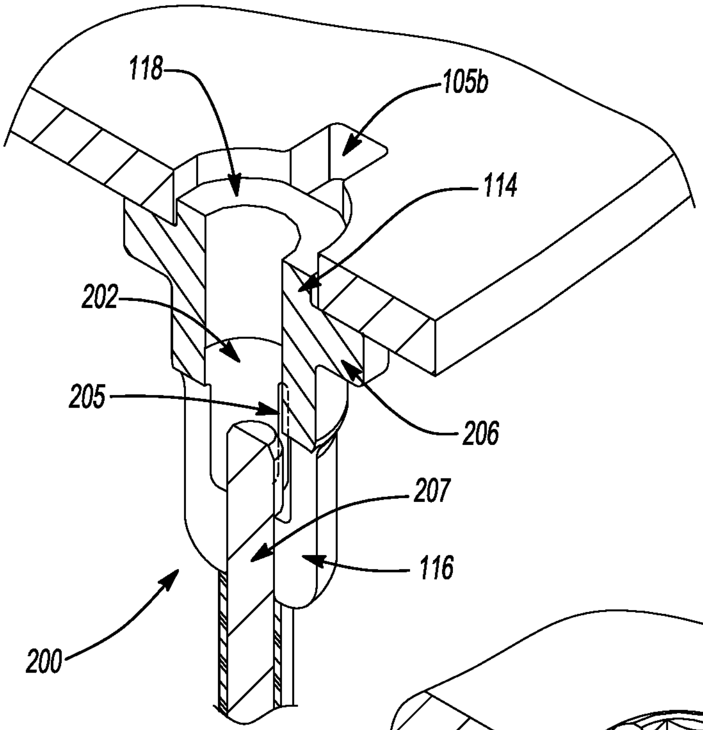
FIG. 7 is a perspective cross-sectional view of the interchangeable coupler of FIG. 6*a* (without its mechanical fastener installed) installed through an aperture of one of the busbars in accordance with the teachings of the present disclosure.

Referring now to FIGS. 4A and 4B, the terminal assembly 100 is illustrated in greater detail. The terminal assembly 100 comprises a plurality of longitudinally arranged electrically conductive busbars, and more specifically power busbars 102, a neutral busbar 104, and optional shunt busbars 106. In this form, a total of three (3) power busbars 102, a single neutral busbar 104, and three (3) shunt busbars 106 are configured for a three-phase power supply configuration. However, it should be understood that any number of busbars to support a different number of power phases may be employed while remaining within the scope of the present disclosure. These electrically conductive busbars generally function as electrical bussing elements to connect the resistive heating elements 18 to each other and to an appropriate power connection (i.e., supply, return, ground). Thus, the name "busbar" should not be construed as limiting these elements to any specific shape or geometric configuration.

In one form, an electrical circuit (not shown) is optionally embedded in at least one of the plurality of longitudinally arranged electrically conductive plates. Such an arrangement is shown in co-pending U.S. application Ser. No. 17/558,956, titled "ENCAPSULATED BUS CIRCUIT FOR FLUID HEATING SYSTEMS," which is commonly owned with the present application and the contents of which are incorporated herein by reference in their entirety. This electrical circuit is similar to a printed circuit board construction, wherein the electrical circuit provides the necessary electrical connections and controls for the electrical heater during operation. It should be understood, however, that the electrical circuit may alternatively be applied to (e.g., deposited, bonded) a distal end face of the electrically conductive busbar rather than being embedded while remaining within the scope of the present disclosure.

The power busbars 102 are configured to connect the power supply 22 to the resistive heating elements 18. Referring specifically to FIG. 4A in combination with FIG. 1, each power busbar 102 includes a terminal post 108 to connect to a power lead 109 from the power supply 22 to a first end (near the power supply portion 16) of the plurality of resistive heating elements 18. Thus, the power busbars 102 function to provide and bus power to different sets of resistive heating elements 18.

The neutral busbar 104 functions as a power return and is offset longitudinally from power busbars 102 as shown. The neutral busbar 102*c* functions as the power return and is configured to receive a second end (near the power supply portion 16) of the plurality of resistive heating elements 18. In one form, the neutral busbar 104 is ring shaped and is a single piece as shown. It should be understood, however, that the configuration of the neutral busbar 104 may be any shape and/or number and still be within the scope of the present disclosure. The neutral busbar 110 includes a neutral connection post (not shown) that is configured to connect to a neutral lead (FIG. 1, element 111) of the power supply 22, such that one end of the resistive heating elements 18 are in communication with the neutral lead 111.

The shunt busbars 106 are optional and are configured as a shunt to provide additional resistance to achieve a desired watt density. More specifically, each shunt busbar 106 corresponds to a power phase of the multiple power phases and is configured to connect one or more of the plurality of resistive heating elements 18 in series. The shunt busbars 106 are also longitudinally offset from the power busbars 102, as well as the neutral busbar 104, which provides sufficient dielectric standoff for operating at medium voltage. Both the power busbars 102 and the optional shunt busbars 106 are spaced apart or separated from each other, to dielectrically separate the different power phases and to inhibit arcing as described in greater detail below. It should be understood that the configuration of the plurality of shunt busbars 106 may also be any geometry or number and still be within the scope of the present disclosure.

Referring now to FIGS. 4B and 5A-5C, each of the power busbars 102, the neutral busbar 104, and optional shunt busbars 106 comprise a plurality of apertures 105 configured to receive electrical terminal portions of the plurality of resistive heating elements 18. In one form as shown, the plurality of apertures 105 are slotted in shape. More specifically, each aperture 105 defines a center portion 105*a* and a set of opposed slots or notches 105*b*. In the example illustrated, the center portion 105*a* has a generally circular shape and the opposed slots 105*b* have a generally rectangular shape. It should be understood that the shape of the plurality of apertures 105 may accommodate any geometry without departing from the scope of the present disclosure.

Figure 8:
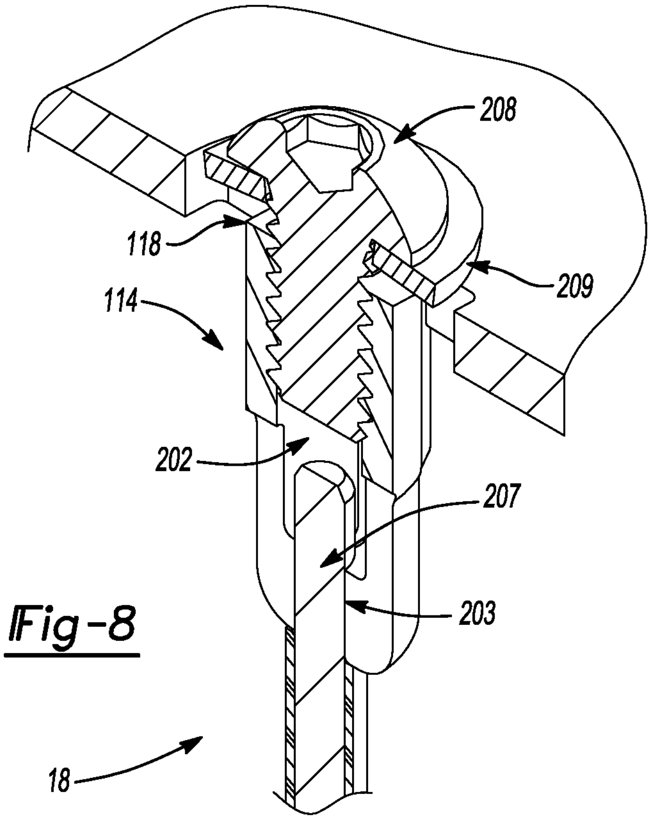
FIG. 8 is a perspective cross-sectional view of the interchangeable coupler of FIG. 7 (with its mechanical fastener installed) in accordance with the teachings of the present disclosure.

Now referring to FIGS. 4A and 6A-8, innovative interchangeable couplers 114 are provided and configured to connect one end of an electrical heating element 18 to at least one of the busbars 102, 104, 106, described above. Each of the interchangeable couplers 114 are configured to be installed within respective apertures 105 of the busbars 102, 104, 106. More specifically, each of the interchangeable couplers 114 includes a main body 116. The main body 116 includes an upper end portion 118, a lower end portion 200, and an internal cavity 202 extending from the upper end portion 118 to the lower end portion 200. In one form, the internal cavity 202 is threaded as shown in FIG. 8 to receive a fastener as described in greater detail below. The bottom portion 200 of the main body 116 further includes a plurality of resiliently flexible (or elastically deformable) gripping members or flexible fingers 204 separated by slots 205. The internal cavity 202 further includes a lower bore 203 (FIG. 6B), which has a diameter slightly smaller than an outer diameter of the terminal pin 207 of a resistive heating element 18. Accordingly, the flexible fingers 204 are configured to deflect outward when the connection pin 207 of a respective heating element 18 is inserted into the lower bore 203. Thus, the flexible fingers 204 contact and secure the respective heating element 18 in position. In one form as shown, a total of four (4) flexible fingers 204 are employed, however, it should be understood that any number of flexible fingers 204 may be used while remaining within the scope of the present disclosure.

As further shown, the main body 116 further includes at least one contact arm 206 extending outwardly from the main body 116 at its upper end portion 118. The contact arm 206 of each interchangeable coupler 114 is configured to be inserted through a respective slot 105*b* (best shown in FIG. 4B) of the aperture 105 and rotated such that its upper surface abuts an opposed side of one of the busbars 102, 104, 106 (best shown in FIGS. 7 and 8). In one form, each interchangeable coupler 114 includes two diametrically opposed contact arms 206 as shown. The diametrically opposed contact arms 206 are similarly configured to be inserted through the opposed slots 105*b* and rotated to abut the opposed side of the respective busbar 102, 104, 106. In one form, the contact arms 206 are rotated about 90 degrees to lock the interchangeable coupler 114 into position. It should be understood that each of the interchangeable couplers 114 may include any number of contact arms 206 and each of the plurality of apertures 105 defines a minimum number of slots to at least equal a number of contact arms 206 provided on a respective interchangeable coupler 114.

As further shown, each interchangeable coupler 114 comprises a fastener 208 configured to be secured within the threaded portion of the internal bore 202 to secure a respective interchangeable coupler 114 to at least one of the busbars 102, 104, 106. A washer 209, which in one form is a Belleville washer, is disposed under the head of the fastener 208 and is optional to inhibit the fastener 208 from loosening and to distribute torqueing loads.

In one form, the interchangeable coupler 114, and more specifically the main body 116, is electrically conductive to provide an active electrical connection of a respective resistive heating element 18 to the respective busbar 102, 104, 106. However, in another form, the main body 116 of the interchangeable coupler 114 is electrically nonconductive to provide a passive electrical connection of a respective resistive heating element 18. The nonconductive interchangeable coupler is initially used when any one of the resistive heating elements 18 is not active or is "out of circuit." When it is desired to electrically connect the resistive heating element 18, the nonconductive interchangeable coupler is removed and a conductive interchangeable coupler is inserted in its place.

Referring back to FIG. 4A, the terminal assembly 100 further includes a baseplate 210 offset longitudinally from the neutral busbar 104. In one form, the baseplate 210 is a generally disc shaped body that closes and seals one end of a tube (not shown) that encloses the heating elements 18. It should be understood that a shape of the baseplate 210 may be any shape and still within the scope of the present disclosure. The baseplate 210 includes a plurality of apertures 212 generally configured to receive the resistive heating elements 18. Further, the terminal assembly 100 includes a plurality of mounting posts 214 to establish a proper offset between the busbars 102, 104, 106.

With continued reference to FIG. 4A, in one form, the terminal assembly 100 includes a phase barrier 222 disposed between a center portion of the baseplate 210 and between the plurality of busbars 102, 104, 106. The phase barrier 222 comprises an electrically insulating material such that the phase barrier 222 provides a dielectric standoff between each power phase of the busbars 102, 104, 106. As shown, in one form, the phase barrier 222 includes a central spindle 224 and a plurality of blades 226. The plurality of blades 226 are securely coupled to the central spindle 224 and extend radially outward from the central spindle 224 between the busbars 102, 104, 106. In one form, the blades 226 are mechanically secured to the central spindle 224, however, the central spindle 224 and the blades 226 may be formed as a single unitary piece.

Figure 9:
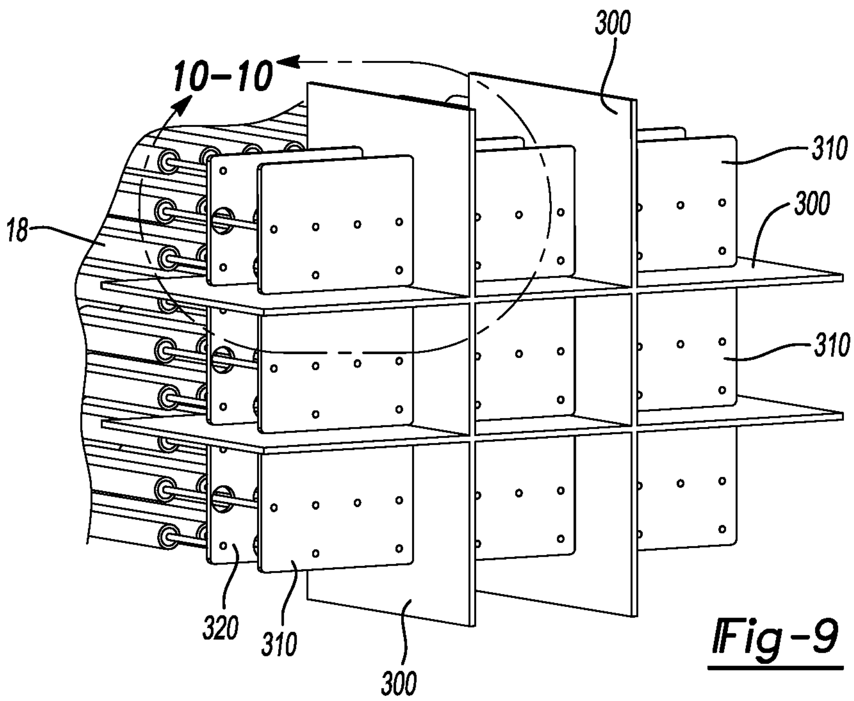
FIG. 9 is a perspective view of another form of power busbars and neutral busbars with a square phase barrier configuration constructed in accordance with the teachings of the present disclosure.
Figure 10:
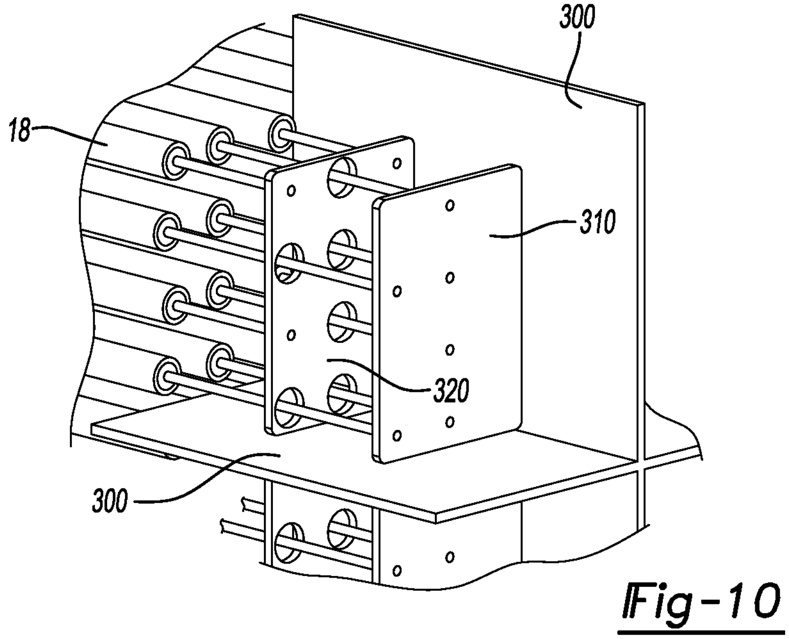
FIG. 10 is an enlarged perspective view of the busbars and phase barrier of FIG. 9 in accordance with the teachings of the present disclosure.
Figure 13:
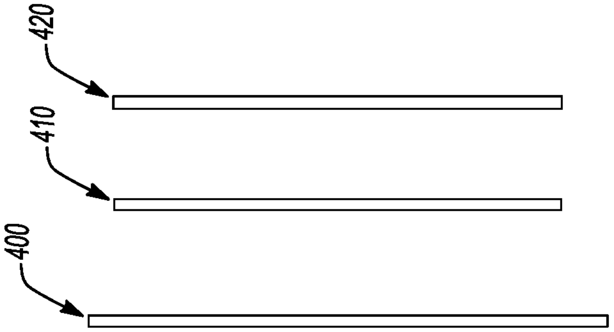
FIG. 13 is a side view of the power busbars of FIG. 11 in accordance with the teachings of the present disclosure.
Figure 12:
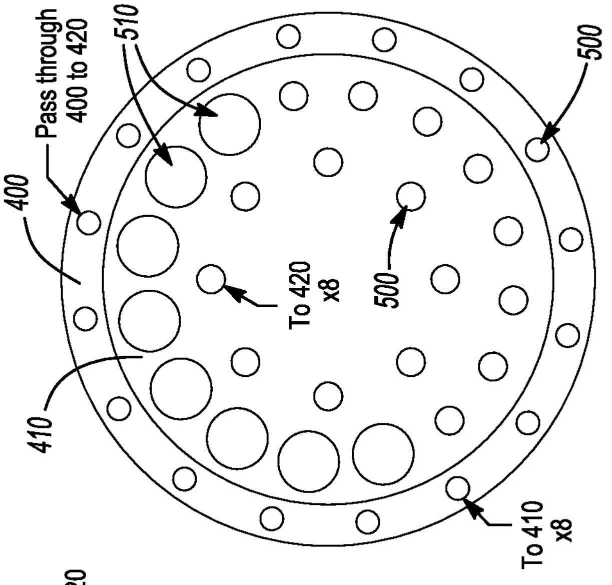
FIG. 12 is a front view of the power busbars of FIG. 11 having one busbar not shown in accordance with the teachings of the teachings of the present disclosure.
Figure 14:
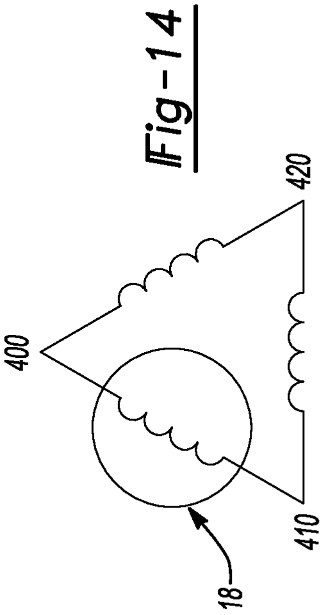
FIG. 14 is an electrical schematic diagram of the three-phase power provided by the power busbars of FIG. 11 in accordance with the teachings of the present disclosure.
Figure 11:
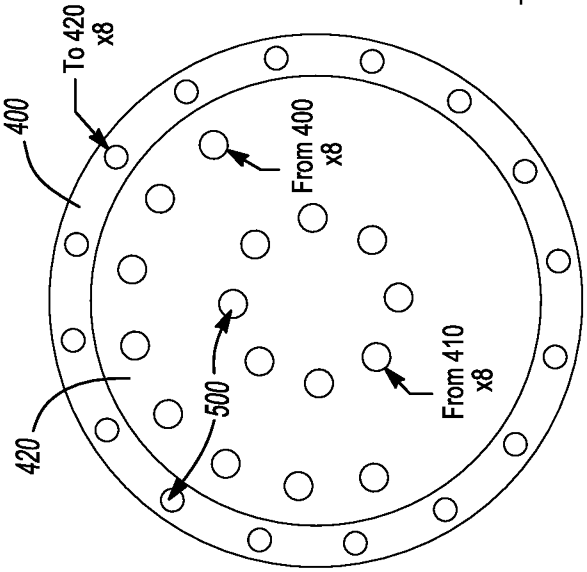
FIG. 11 is a front view of another form of power busbars in a three-phase configuration and constructed in accordance with the teachings of the present disclosure.

Referring now to FIGS. 9 and 10, an alternate form of a phase barrier having a square pattern is illustrated and generally indicated by reference numeral 300. In this form, a total of nine (9) conductive busbars 310 (the power busbars) and 320 (the neutral busbars) are employed and are each individually separated by the phase barrier 300. Accordingly, one end of each resistive heating element 18 is electrically connected to a power busbar 310, and the other end of the resistive heating element 18 is electrically connected to a neutral busbar 320 as shown. The interchangeable couplers 114 as illustrated and described above are employed with this variation of the present disclosure to secure the resistive heating elements 18 to the busbars 300/310 but are not shown for purposes of clarity. It should be understood that these and other configurations of phase barriers and busbars (including a shunt busbar as illustrated and described above) should be construed as falling within the scope of the present disclosure.

Referring to FIGS. 11-14, an exemplary configuration of a three-phase power supply with power busbars 400, 410, and 420 in a delta construction is shown. The resistive heating elements 18 are connected to each busbar at the smaller apertures 500 as shown, while larger apertures 510 are provided as a pass-through to connect the resistive heating elements 18 from busbar 400 to busbar 420. (Busbar 420 is hidden in FIG. 12). It should be understood that this configuration of busbars, resistive heating element connections, and the three-phase power is merely exemplary and is provided to demonstrate the variety of configurations that may be employed with the innovative terminal assembly and interchangeable couplers according to the teachings herein.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A terminal assembly for a heater system having a plurality of resistive heating elements arranged in multiple power phases, the terminal assembly comprising:

a plurality of power busbars, each power busbar corresponding to one power phase of the multiple power phases, and each power busbar being configured to connect a corresponding power lead from one of the multiple power phases and a first end of a corresponding subset of the plurality of resistive heating elements such that the corresponding subset of the plurality of resistive heating elements are in electrical communication with the corresponding power lead;

a neutral busbar offset longitudinally from the plurality of power busbars and configured to receive a second end of the plurality of resistive heating elements;

a phase barrier disposed between each of the plurality of power busbars; and a plurality of interchangeable couplers configured to connect two or more resistive heating elements of the plurality of resistive heating elements to at least one power busbar or at least one neutral busbar.

2. The terminal assembly of claim 1, further comprising a plurality of shunt busbars, each shunt busbar corresponding to one power phase of the multiple power phases, and each shunt busbar being configured to connect one or more of the plurality of resistive heating elements in series.

3. The terminal assembly of claim 2, wherein the plurality of the shunt busbars are longitudinally offset between the plurality of power busbars and the neutral busbar.

4. The terminal assembly of claim 1, wherein the multiple power phases comprise three power phases.

5. The terminal assembly of claim 1, further comprising a baseplate offset longitudinally from the neutral busbar.

6. The terminal assembly of claim 5, further comprising a plurality of mounting posts disposed between the baseplate and at least one of the neutral busbar and the plurality of power busbars.

7. The terminal assembly of claim 1, wherein each power busbar connects the corresponding power lead from one of the multiple power phases on one side and the first end of the corresponding subset of the plurality of resistive heating elements on an opposite side.

8. The terminal assembly of claim 1, wherein each of the plurality of power busbars and the neutral busbars includes a plurality of apertures and the plurality of interchangeable couplers are installed within the apertures.

9. The terminal assembly of claim 8, wherein at least one interchangeable coupler comprises at least one contact arm and at least one of the apertures defines at least one slot, wherein the at least one contact arm of the at least one interchangeable coupler is configured to be inserted through the at least one slot and rotated to abut an opposed side of the at least one power busbar or the at least one neutral busbar.

10. The terminal assembly according to claim 9, wherein the at least one interchangeable coupler comprises opposed contact arms and the at least one aperture defines opposed slots, wherein the opposed contact arms are configured to be inserted through the opposed slots and rotated to abut the opposed side of the at least one power busbar or the at least one neutral busbar.

11. The terminal assembly according to claim 1, at least one interchangeable coupler comprises a threaded internal bore and the terminal assembly further comprises a fastener disposed within the threaded internal bore to secure the at least one interchangeable coupler to the at least one power busbar or the at least one neutral busbar.

12. The terminal assembly according to claim 1, wherein the plurality of interchangeable couplers are either electrically conductive to provide an active electrical connection of a respective resistive heating element or electrically non-conductive to provide a passive electrical connection of a respective resistive heating element.

13. The terminal assembly of claim 1, wherein the phase barrier includes a central spindle and a plurality of blades extending radially away from the central spindle.

14. A heating system comprising:

the terminal assembly of claim 1; and the plurality of resistive heating elements coupled to the terminal assembly.

15. The heating system of claim 14, wherein:

first and second ends of the plurality of resistive heating elements are located within the terminal assembly, and at least one of the first and second ends is uncoupled to the plurality of power busbars and/or the neutral busbar via an interchangeable coupler that is electrically nonconductive.

16. The heating system of claim 15, wherein at least one resistive heating element comprises a terminal extension disposed within one of the interchangeable couplers.

17. The heating system of claim 16, further comprising an insulating material surrounding the terminal extension.

18. A terminal assembly for a heater system having a plurality of resistive heating elements arranged in multiple power phases, the terminal assembly comprising:

a plurality of power busbars, each power busbar corresponding to one power phase of the multiple power phases, and each power busbar being configured to connect a corresponding power lead from one of the multiple power phases and a first end of a corresponding subset of the plurality of resistive heating elements such that the corresponding subset of the plurality of resistive heating elements are in electrical communication with the corresponding power lead;

a neutral busbar offset longitudinally from the plurality of power busbars and configured to receive a second end of the plurality of resistive heating elements;

a plurality of shunt busbars, each shunt busbar corresponds to one power phase of the multiple power phases and a power busbar of the plurality of power busbars, and each shunt busbar being configured to connect at least two of the plurality of resistive heating elements in a series connection with one another between a corresponding power busbar and the neutral busbar;

a phase barrier disposed between each power phase of the plurality of power busbars and of the plurality of shunt busbars; and a plurality of interchangeable couplers configured to connect two or more resistive heating elements of the plurality of resistive heating elements to at least one power busbar or at least one neutral busbar.

19. The terminal assembly of claim 18, wherein the plurality of the shunt busbars is longitudinally offset between the plurality of power busbars and the neutral busbar.

20. The terminal assembly of claim 18, wherein each of the plurality of power busbars, each of the plurality of shunt busbars, and the neutral busbar are spaced apart from each other.

21. The terminal assembly of claim 19, wherein the multiple power phases comprise of three power phases.

22. The terminal assembly of claim 19, further comprising a baseplate offset longitudinally from the neutral busbar.

23. The terminal assembly of claim 22, further comprising a plurality of mounting posts disposed between the baseplate and the neutral busbar and between the baseplate and the plurality of shunt busbars.

* * * * *